United States Patent
Yamamoto

(10) Patent No.: US 9,057,937 B2
(45) Date of Patent: Jun. 16, 2015

(54) IMAGE PROJECTION DEVICE AND COLOR CORRECTION METHOD

(75) Inventor: Kenji Yamamoto, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 239 days.

(21) Appl. No.: 13/816,922

(22) PCT Filed: Sep. 10, 2010

(86) PCT No.: PCT/JP2010/065578
§ 371 (c)(1),
(2), (4) Date: Feb. 13, 2013

(87) PCT Pub. No.: WO2012/032644
PCT Pub. Date: Mar. 15, 2012

(65) Prior Publication Data
US 2013/0141699 A1    Jun. 6, 2013

(51) Int. Cl.
G03B 21/14    (2006.01)
H04N 9/31    (2006.01)
H04N 3/23    (2006.01)
G03B 21/20    (2006.01)
G09G 3/00    (2006.01)
G09G 3/34    (2006.01)

(52) U.S. Cl.
CPC .......... G03B 21/147 (2013.01); G03B 21/206 (2013.01); G09G 3/002 (2013.01); G09G 3/3413 (2013.01); G09G 2320/0633 (2013.01); G09G 2320/064 (2013.01); G09G 2320/0666 (2013.01); G09G 2320/0693 (2013.01); G09G 2330/021 (2013.01); G09G 2360/145 (2013.01); H04N 9/3182 (2013.01)

(58) Field of Classification Search
CPC .......... G03B 21/00; G03B 21/14; H04N 9/31; H04N 3/23
USPC .......... 353/31, 85, 69; 345/647; 348/744, 746
See application file for complete search history.

(56) References Cited

U.S. PATENT DOCUMENTS

2010/0201894 A1* 8/2010 Nakayama et al. .......... 348/745
2011/0316896 A1* 12/2011 Okamoto et al. ............ 345/690

FOREIGN PATENT DOCUMENTS

| JP | 2003-066369 A | 3/2003 |
| JP | 2003-333611 A | 11/2003 |
| JP | 2004-354882 A | 12/2004 |
| JP | 2007-065574 A | 3/2007 |

OTHER PUBLICATIONS

International Search Report dated Oct. 26, 2010 in PCT/JP2010/065578, with English translation thereof.

* cited by examiner

Primary Examiner — William C Dowling
Assistant Examiner — Magda Cruz
(74) Attorney, Agent, or Firm — McGinn IP Law Group, PLLC

(57) ABSTRACT

An image projection device includes a light source that emits a plurality of colored lights and a projection section that modulates each colored light emitted by the light source according to image data and projects an image onto a projection surface, a storage section that stores projection surface information indicating a spectral reflectance of the projection surface, and a correction section that determines, when the image data is received, a correction value for correcting a color shift in the image on the projection surface using the projection surface information, and corrects an intensity value of a colored light emitted by the light source by controlling the light source according to the correction value.

3 Claims, 3 Drawing Sheets

IMAGE PROJECTION DEVICE AND COLOR CORRECTION METHOD

TECHNICAL FIELD

The present invention relates to an image projection device and a color correction method.

BACKGROUND ART

Patent Literature 1 describes a projector that performs a projection surface color correction method for accurately reproducing a color regardless of the color of the projection surface such as a wall. The projector described in Patent Literature 1 includes a light source, wall color storage means for storing the spectral reflectance of the projection surface and color conversion means.

According to the projector described in Patent Literature 1, when an image is input, the color conversion means converts the mixing amounts of primary colors R, G and B of the input image into corrected mixing amounts R', G' and B' by a conversion matrix using the spectral reflectance of a projection surface stored in the wall color storage means.

Incidentally, in recent years, development of low-power consumption products that are environmentally friendly is being carried out. With respect to projectors, power consumption is expected to increase as a result of image projection devices that feature high resolution and high luminance. Thus, it is important, with respect to a projector that uses a lamp light source, an LED (Light Emitting Diode) light source or a laser light source, that the power of the light source itself that requires the most power be reduced.

CITATION LIST

Patent Literature

Patent Literature 1: JP2003-333611A

SUMMARY OF INVENTION

Technical Problem

With the projector described in Patent Literature 1, the mixing amounts of primary colors R, G and B of an input image are converted into corrected mixing amounts R', G' and B' by a conversion matrix that uses the spectral reflectance of a projection surface that is stored in the wall color storage means.

For example, in the case in which the corrected mixing amounts R, G and B have been converted into smaller values than the mixing amounts of primary colors R, G and B of an input image, the necessary light intensity is reduced to the degree to which the mixing amounts R, G and B of the input image have been reduced.

Methods of reducing the light intensity includes attenuating the intensity of each of lights R, G and B emitted from a light source or reducing the brightness of the illumination from a light source, but the latter is rarely performed, and the intensity of each of lights R, G and B emitted from a light source is attenuated.

Accordingly, even if the corrected mixing amounts R, G and B have been converted into smaller values than the mixing amounts of primary colors R, G and B of an input image, this does not contribute to reducing the power consumption of the light source itself.

The object of the present invention is to provide an image projection device and a color correction method which are capable of reducing the power consumption of an image projection device that performs color correction.

Solution to Problem

An image projection device of the present invention is an image projection device including light source means that emits a plurality of colored lights, and projection means that modulates each colored light emitted by said light source means according to image data and projects an image onto a projection surface, the image projection device including storage means that stores projection surface information indicating a spectral reflectance of the projection surface, and correction means that determines, when the image data is received, a correction value for correcting a color shift in the image on the projection surface using the projection surface information, and corrects intensity values of the plurality of colored lights emitted by said light source means by controlling said light source means according to the correction value.

A color correction method of the present invention is a color correction method of an image projection device including light source means that emits a plurality of colored lights, and projection means that modulates each colored light emitted by the light source means according to image data and projects an image on a projection surface, the color correction method including the steps of storing projection surface information indicating a spectral reflectance of the projection surface, and determining, when the image data is received, a correction value for correcting a color shift in the image on the projection surface using the projection surface information, and correcting intensity values of the plurality of colored lights emitted by the light source means by controlling the light source means according to the correction value.

Advantageous Effect of Invention

According to the present invention, the power consumption of an image projection device that performs color correction can be reduced.

DESCRIPTION OF EMBODIMENTS

In the following, an exemplary embodiment will be described with reference to the drawings.

Figure 1:
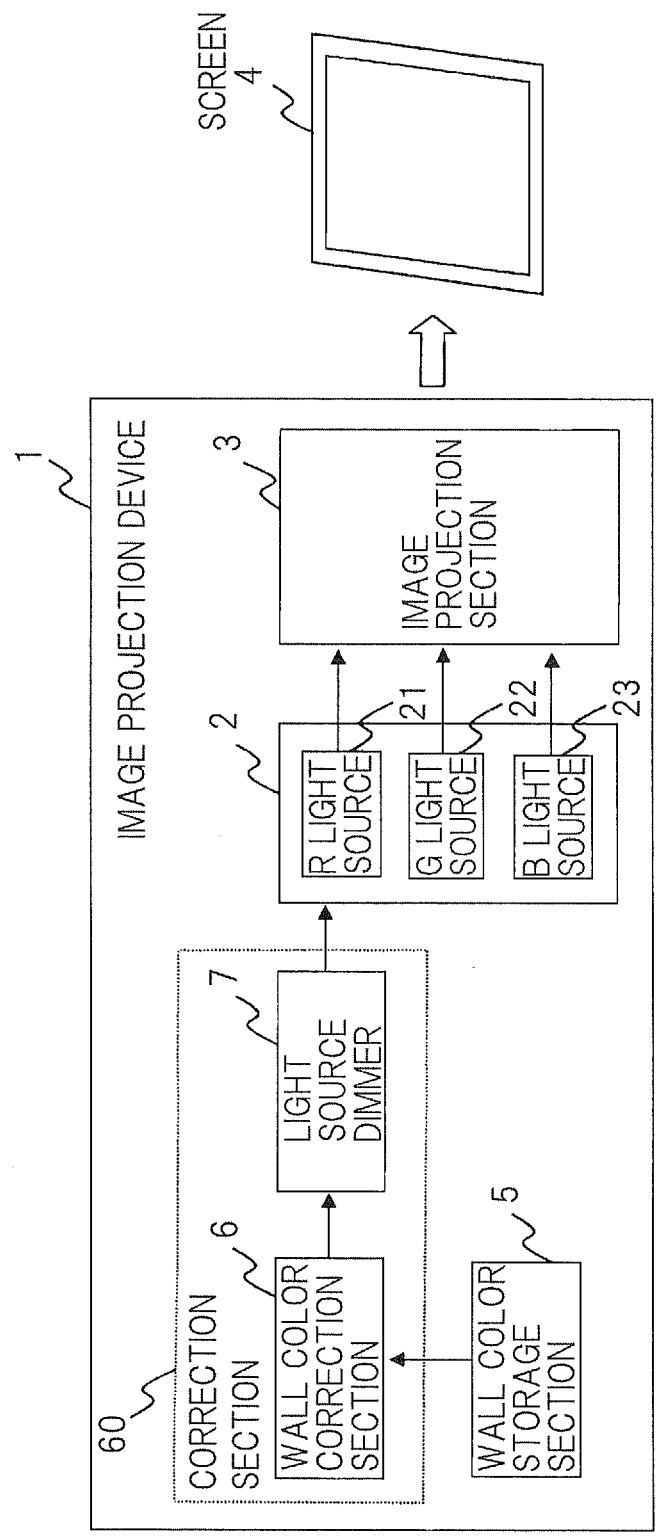
FIG. 1 is a diagram showing an image projection device according to a first exemplary embodiment.

FIG. 1 is a diagram showing an image projection device of a first exemplary embodiment.

Image projection device 1 is a color correction projector that corrects a color shift that occurs in an image on a projection surface due to the color of the projection surface of screen 4.

Image projection device 1 includes light source section 2, image projection section 3, wall color storage section 5 and correction section 60.

Light source section 2 can be generally referred to as a light source means.

Light source section 2 emits each colored light in a plurality of colors to image projection section 3. In the present exemplary embodiment, red, green and blue colored lights are used as a plurality of colored lights. Note that a plurality of colored lights may include a white or yellow colored light, in addition to the red, green and blue colored lights.

Light source section 2 includes R (red) light source 21, G (green) light source 22 and B (blue) light source 23. As R light source 21, G light source 22 and B light source 23, LEDs or lasers are used, for example.

R light source 21 produces a red-colored light, and emits the same to image projection section 3. G light source 22 produces a green-colored light, and emits the same to image projection section 3. B light source 23 produces a blue-colored light, and emits the same to image projection section 3.

Image projection section 3 can be generally referred to as projection means.

When image data is received, image projection section 3 modulates each colored light emitted by light source section 2 according to the image data, and projects the image onto the projection surface of screen 4.

In the present exemplary embodiment, image projection section 3 receives image data expressed in three colors: red, green and blue. When the image data is received, image projection section 3 separately modulates, on a per color light basis, each colored light emitted by light source section 2 according to the image data, using a spatial light modulator provided for each colored light, for example.

When image processing section 3 modulates each colored light emitted from light source section 2, image processing section 3 combines, using a dichroic prism, for example, the colored lights which have been modulated, and projects the combined light to the projection surface of screen 4 through a projection lens.

Wall color storage section 5 can be generally referred to as storage means.

Wall color storage section 5 stores projection surface information indicating the spectral reflectance of the projection surface of screen 4. As the spectral reflectance of the projection surface, reflection properties of the projection surface or color data of the projection surface are used, for example.

In a situation where cream-colored screen 4 is used, spectral reflectance $\beta$ as shown in Equation 1 is stored in wall color storage section 5.

[Math. 1]

$$\beta = \begin{pmatrix} \beta_{380} & 0 & \cdots & 0 \\ 0 & \beta_{385} & \cdots & 0 \\ \vdots & \vdots & \ddots & \vdots \\ 0 & 0 & \cdots & \beta_{780} \end{pmatrix} \quad \text{Equation 1}$$

For example, wall color storage section 5 may store a plurality of pieces of projection surface information. In the case in which a plurality of pieces of projection surface information are stored, wall color correction section 6 receives selection information specifying the projection surface information selected by a user from the plurality of pieces of projection surface information, and then, when image data is received, wall color correction section 6 extracts the projection surface information specified by the selection information from among the pieces of projection surface information in wall color storage section 5.

Correction section 60 can be generally referred to as correction means.

When image data is received, correction section 60 determines a correction value for correcting a color shift in the image on the projection surface using the projection surface information in wall color storage section 5. When the correction value is determined, correction section 60 controls light source section 2 according to the correction value, and corrects the intensity value of a colored light emitted by light source section 2. Correction section 60 includes wall color correction section 6 and light source dimmer 7.

Wall color correction section 6 can be generally referred to as calculation means.

When the image data is received, wall color correction section 6 determines the correction value for correcting the color shift in the image on the projection surface of screen 4 using the projection surface information stored in wall color storage section 5.

In the present exemplary embodiment, when the image data is received, wall color correction section 6 determines, as the correction value, a conversion matrix for converting the image on the projection surface of screen 4 into an image indicated by the image data, using the projection surface information in wall color storage section 5.

When the correction value is determined, wall color correction section 6 calculates the intensity value of a colored light which has been corrected, based on the correction value and predetermined values of intensity of a plurality of colored lights. In the present exemplary embodiment, an initial value of the intensity of each colored light determined on the premise that projection is performed on white screen 4 is used as the predetermined value of intensity of the colored light.

Here, a principle of color correction by wall color correction section 6 is described based on the theory of color reproduction.

Arbitrary light (image) I projected from image projection section 3 is expressed by the following equation.

[Math. 2]

$$I = \begin{pmatrix} I_r & I_g & I_b \end{pmatrix} \begin{pmatrix} R \\ G \\ B \end{pmatrix}$$

Note that Ir, Ig and Ib indicate the spectral intensities per unit of red, green and blue colored lights. Also, R, G and B indicate a relative intensity of spectral intensity Ir, a relative intensity of spectral intensity Ig and a relative intensity of spectral intensity Ib, respectively.

Light I and spectral intensities Ir, Ig and Ib are expressed by the following equations, for example.

$$I = (I_{380} I_{385} \ldots I_{780})^t$$

$$I_r = (I_{r,380} I_{r,385} \ldots I_{r,780})^t$$

$$I_g = (I_{g,380} I_{g,385} \ldots I_{g,780})^t$$

$$I_b = (I_{b,380} I_{b,385} \ldots I_{b,780})^t \quad \text{[Math. 3]}$$

Note that elements of each of light I and spectral intensities Ir, Ig and Ib represent the intensities of light in each wavelength.

Furthermore, when light I is measured using CIE (Commission Internationale de l'Eclairage) 1931 XYZ coordinates, the measurement value of light I is expressed by Equation 2.

[Math. 4]

$$\begin{pmatrix} X_I \\ Y_I \\ Z_I \end{pmatrix} = \begin{pmatrix} \bar{x}^t \\ \bar{y}^t \\ \bar{z}^t \end{pmatrix} \cdot I \quad \text{Equation2}$$

Note that $\bar{x}^t$, $\bar{y}^t$, and $\bar{z}^t$ represent the color-matching function, and that $X_I$, $Y_I$ and $Z_I$ indicate three stimulus values representing the colors of the image.

For colorimetric color reproduction, the three stimulus values $X_I$, $Y_I$ and $Z_I$ are to be realized on the projection surface of screen 4.

In the case in which screen 4 has the reflection properties of spectral reflectance $\beta$ as expressed by Equation 1, for example, spectral intensities Ir, Ig and Ib are changed on the projection surface due to the color of screen 4. Spectral intensities I'r, I'g and I'b which have changed because of cream-colored screen 4 are expressed by the following equations.

$$I'_r = \beta I_r = (\beta I_{r,380} \beta I_{r,385} \ldots \beta I_{r,780})^t$$

$$I'_g = \beta I_g = (\beta I_{g,380} \beta I_{g,385} \ldots \beta I_{g,780})^t$$

$$I'_b = \beta I_b = (\beta I_{b,380} \beta I_{b,385} \ldots \beta I_{b,780})^t \quad \text{[Math. 5]}$$

Also, light (the image on the projection surface) I' obtained by mixing (combining) spectral intensities I'r, I'g and I'b which have been changed on screen 4 is expressed by Equation 3.

[Math. 6]

$$I' = \begin{pmatrix} I'_r & I'_g & I'_b \end{pmatrix} \begin{pmatrix} R \\ G \\ B \end{pmatrix} \quad \text{Equation3}$$

Moreover, the colorimetric value of light I' is expressed by Equation 4.

[Math. 7]

$$\begin{pmatrix} X'_I \\ Y'_I \\ Z'_I \end{pmatrix} = \begin{pmatrix} \bar{x}^t \\ \bar{y}^t \\ \bar{z}^t \end{pmatrix} \cdot I' \quad \text{Equation4}$$

Note that $X'_I$, $Y'_I$ and $Z'_I$ indicate three stimulus values representing the colors of the image on the projection surface of screen 4.

Three stimulus values $X'_I$, $Y'_I$ and $Z'_I$ are different from the three stimulus values $X_I$, $Y_I$ and $Z_I$ expressed by Equation 2. Accordingly, light I and light I' are of colors different from each other.

Accordingly, if the three stimulus values $X'_I$, $Y'_I$ and $Z'_I$ which have been calculated by substituting light I' of relative intensities R', G' and B' different from relative intensities R, G and B expressed by Equation 3 into Equation 4 equals three stimulus values $X_I$, $Y_I$ and $Z_I$ expressed by Equation 2, reproduced colors coincide with each other within color reproduction ranges of the two. That is, the following equation is to be established.

[Math. 8]

$$\begin{pmatrix} \bar{x}^t \beta I_r & \bar{x}^t \beta I_g & \bar{x}^t \beta I_b \\ \bar{y}^t \beta I_r & \bar{y}^t \beta I_g & \bar{y}^t \beta I_b \\ \bar{z}^t \beta I_r & \bar{z}^t \beta I_g & \bar{z}^t \beta I_b \end{pmatrix} \begin{pmatrix} R \\ G \\ B \end{pmatrix} = \begin{pmatrix} \bar{x}^t \beta I_r & \bar{x}^t \beta I_g & \bar{x}^t \beta I_b \\ \bar{y}^t \beta I_r & \bar{y}^t \beta I_g & \bar{y}^t \beta I_b \\ \bar{z}^t \beta I_r & \bar{z}^t \beta I_g & \bar{z}^t \beta I_b \end{pmatrix} \begin{pmatrix} R' \\ G' \\ B' \end{pmatrix}$$

If the equation above is solved for relative intensities R', G' and B', the following equation is obtained as the solution.

[Math. 9]

$$\begin{pmatrix} R' \\ G' \\ B' \end{pmatrix} = \begin{pmatrix} \bar{x}^t \beta I_r & \bar{x}^t \beta I_g & \bar{x}^t \beta I_b \\ \bar{y}^t \beta I_r & \bar{y}^t \beta I_g & \bar{y}^t \beta I_b \\ \bar{z}^t \beta I_r & \bar{z}^t \beta I_g & \bar{z}^t \beta I_b \end{pmatrix} \begin{pmatrix} \bar{x}^t I_r & \bar{x}^t I_g & \bar{x}^t I_b \\ \bar{y}^t I_r & \bar{y}^t I_g & \bar{y}^t I_b \\ \bar{z}^t I_r & \bar{z}^t I_g & \bar{z}^t I_b \end{pmatrix} \begin{pmatrix} R \\ G \\ B \end{pmatrix}$$

The equation above may further be expressed by Equation 5.

[Math. 10]

$$\begin{pmatrix} R' \\ G' \\ B' \end{pmatrix} = A \begin{pmatrix} R \\ G \\ B \end{pmatrix} \quad \text{Equation5}$$

Note that conversion matrix A is expressed by Equation 6.

[Math. 11]

$$A \equiv \begin{pmatrix} \alpha_{11} & \alpha_{12} & \alpha_{13} \\ \alpha_{21} & \alpha_{22} & \alpha_{23} \\ \alpha_{31} & \alpha_{32} & \alpha_{33} \end{pmatrix} \quad \text{Equation6}$$

$$\equiv \begin{pmatrix} \bar{x}^t \beta I_r & \bar{x}^t \beta I_g & \bar{x}^t \beta I_b \\ \bar{y}^t \beta I_r & \bar{y}^t \beta I_g & \bar{y}^t \beta I_b \\ \bar{z}^t \beta I_r & \bar{z}^t \beta I_g & \bar{z}^t \beta I_b \end{pmatrix}^{-1} \begin{pmatrix} \bar{x}^t I_r & \bar{x}^t I_g & \bar{x}^t I_b \\ \bar{y}^t I_r & \bar{y}^t I_g & \bar{y}^t I_b \\ \bar{z}^t I_r & \bar{z}^t I_g & \bar{z}^t I_b \end{pmatrix}$$

Elements (correction values) $\alpha 11$ to $\alpha 33$ shown in Equation 6 are calculated using the spectral intensity of each colored light emitted by light source section 2 used for image projection device 1 and the spectral reflectance of the projection surface of screen 4.

Note that elements $\alpha 11$ to $\alpha 33$ may also be calculated, as expressed by Equation 7, using the color value of each colored light emitted by light source section 2 and the color value of each colored light which has been emitted, and projected onto the projection surface, by light source section 2 being reflected by the projection surface.

[Math. 12]

$$A \equiv \begin{pmatrix} \alpha_{11} & \alpha_{12} & \alpha_{13} \\ \alpha_{21} & \alpha_{22} & \alpha_{23} \\ \alpha_{31} & \alpha_{32} & \alpha_{33} \end{pmatrix} \quad \text{Equation7}$$

$$\equiv \begin{pmatrix} X'_r & X'_g & X'_b \\ Y'_r & Y'_g & Y'_b \\ Z'_r & Z'_g & Z'_b \end{pmatrix}^{-1} \begin{pmatrix} X_r & X_g & X_b \\ Y_r & Y_g & Y_b \\ Z_r & Z_g & Z_b \end{pmatrix}$$

Here, Xr, Yr and Zr, Xg, Yg and Zg, and Xb, Yb and Zb indicate the color values of respective colored lights emitted by light source section 2. Also, X'r, Y'r and Z'r, X'g, Y'g and Z'g, and X'b, Y'b and Z'b indicate the color values of respective reflected colored lights which have been emitted, and projected onto the projection surface, by light source section 2 being reflected.

In the present exemplary embodiment, the intensity of each colored light emitted by R light source 21, G light source 21 and B light source 21 is adjusted, and relative intensities R, G and B and relative intensities R', G' and B' are made to coincide. Accordingly, Equation 5 may be expressed by Equation 8.

[Math. 13]

$$\begin{pmatrix} R'_L \\ G'_L \\ B'_L \end{pmatrix} = A \begin{pmatrix} R_L \\ G_L \\ B_L \end{pmatrix} \quad \text{Equation 8}$$

Note that $R_L$, $G_L$ and $B_L$ each indicates a predetermined value (an initial value) of the intensity of each colored light emitted by R light source 21, G light source 22 and B light source 23. The initial values $R_L$, $G_L$ and $B_L$ are values for white balance adjustment determined assuming white screen 4, for example. Also, $R'_L$, $G'_L$ and $B'_L$ each indicates the intensity value of each colored light after correction.

Accordingly, in the present exemplary embodiment, wall color correction section 6 determines, as a correction value, using the projection surface information in wall color storage section 5, conversion matrix A for converting an image before correction on the projection surface of screen 4 into an image indicated by image data. That is, wall color correction section 6 calculates conversion matrix A using the spectral intensity of each colored light emitted by light source section 2 and the spectral reflectance of the projection surface indicated by the projection surface information.

Specifically, when the image data is received, wall color correction section 6 calculates three stimulus values $X_I$, $Y_I$ and $Z_I$ of the image indicated by the image data, based on Equation 2.

Also, when the image data is received, wall color correction section 6 calculates three stimulus values $X'_I$, $Y'_I$ and $Z'_I$ of the image before correction on screen 4, using the image data and the projection surface information stored in wall color storage section 5 and based on Equation 4.

After calculating three stimulus values $X_I$, $Y_I$ and $Z_I$ of the image data and three stimulus values $X'_I$, $Y'_I$ and $Z'_I$ of the image on the projection surface before correction, wall color correction section 6 determines, as a correction value, based on Equation 5, conversion matrix A for converting the three stimulus values $X'_I$, $Y'_I$ and $Z'_I$ into three stimulus values $X_I$, $Y_I$ and $Z_I$.

When conversion matrix A is determined, wall color correction section 6 calculates intensity values $R'_L$, $G'_L$ and $B'_L$ of respective colored lights after correction, using conversion matrix A and initial values $R_L$, $G_L$ and $B_L$ and based on Equation 8.

When intensity values $R'_L$, $G'_L$ and $B'_L$ of respective colored lights after correction are calculated, wall color correction section 6 supplies intensity values $R'_L$, $G'_L$ and $B'_L$ of respective colored lights after correction to light source dimmer 7.

Light source dimmer 7 can be generally referred to as dimmer means.

Light source dimmer 7 controls light source section 2 according to the correction value, and adjusts the intensity values of a plurality of colored lights emitted by light source section 2 to the intensity values of a plurality of colored lights calculated by wall color correction section 6.

In the present exemplary embodiment, when intensity values $R'_L$, $G'_L$ and $B'_L$ of respective colored lights after correction are received, light source dimmer 7 adjusts the intensity value of colored light emitted by R light source 21 to intensity value $R'_L$, the intensity value of colored light emitted by G light source 22 to intensity value $G'_L$, and the intensity value of colored light emitted by B light source 23 to intensity value $B'_L$.

Specifically, light source dimmer 7 supplies driving power to each of R light source 21, G light source 22 and B light source 23, and causes R light source 21, G light source 22 and B light source 23 to emit light.

Also, light source dimmer 7 changes the level of driving power supplied to each of R light source 21, G light source 22 and B light source 23, and increases or reduces the intensity of each colored light emitted from R light source 21, G light source 22 and B light source 23.

For example, light source dimmer 7 changes the level of driving power by adjusting the level of driving current supplied to light source section 2. Alternatively, light source dimmer 7 may change the level of driving power by applying pulse width modulation (PWM) to driving current supplied to light source section 2.

Next, an operation of image projection device 1 will be described.

Figure 2:
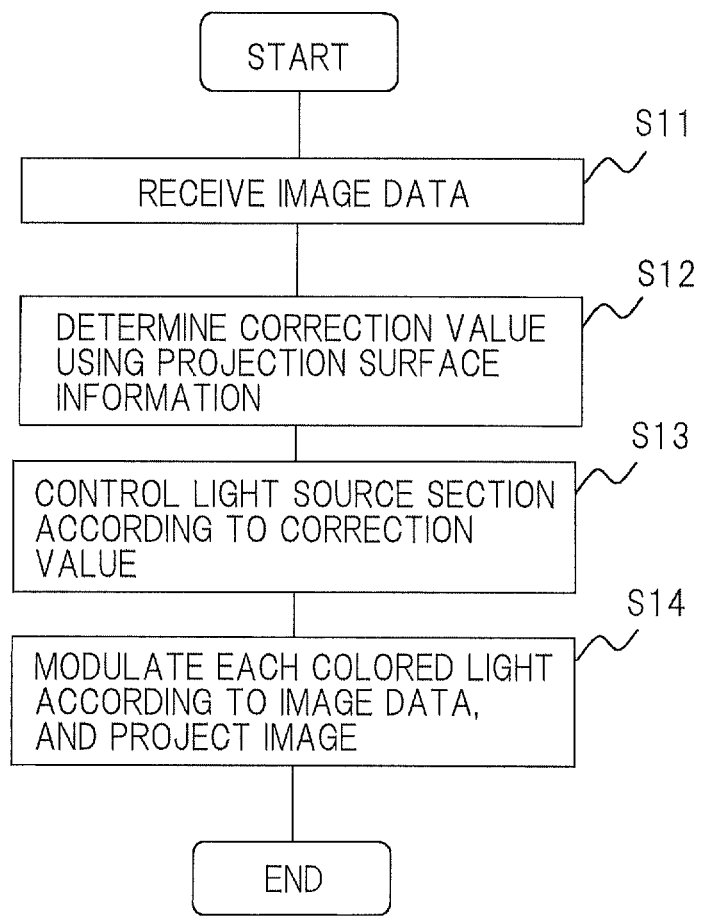
FIG. 2 is a diagram showing an example of procedural steps of a color correction method of image projection device 1.

FIG. 2 is a flow chart showing example procedural steps of a color correction method of image projection device 1.

First, correction section 60 receives image data (step S11).

When the image data is received, correction section 60 determines a correction value for correcting the color shift in an image on the projection surface of screen 4 using projection surface information stored in wall color storage section 5 (step S12). Specifically, correction section 60 determines conversion matrix A as the correction value, based on Equation 6 and using the projection surface information.

When the correction value is determined, correction section 60 controls light source section 2 according to the correction value and corrects the intensity values of a plurality of colored lights emitted by light source section 2 (step S13).

When correction section 60 corrects the intensity of each colored light emitted by light source section 2, image projection section 3 modulates, on a per colored light basis, each colored light emitted by light source section 2 according to the image data, combines each colored light which has been modulated, and projects an image on screen 4 (step S14). When step S14 is over, the series of procedural steps for the color correction method is finished.

According to the first exemplary embodiment, image projection device 1 includes wall color storage section 5 that stores projection surface information that indicates the spectral reflectance of the projection surface of screen 4, and when image data is received, correction section 60 determines a correction value for correcting the color shift in an image on the projection surface using the projection surface information in wall color storage section 5, controls light source section 2 according to the correction value and adjusts the intensity values of a plurality of colored lights emitted by light source section 2.

Accordingly, since image projection device 1 controls light source section 2 and adjusts the intensity of colored light emitted by light source section 2 according to a correction value, the color shift in a display image displayed on screen 4 that occurs due to the color of screen 4 can be corrected.

For example, in a situation where green screen 4 is used for image projection device 1 whose light source section 2 emits colored lights of red, green and blue, the intensity of green colored light emitted by light source section 2 is reduced in many cases. Thus, image projection device 1 is enabled to reduce the amount of power that is used by light source section 2 and that is necessary for emitting green light.

Therefore, according to the first exemplary embodiment, the power consumption of image projection device 1 for correcting a color shift in a display image that occurs due to the color of the projection surface of screen 4 can be reduced. In particular, in a situation where screen 4 that has the same color as the color that is emitted by a light source that consumes a large amount of power is used there is an even greater increase in the effect of reducing the power consumption of image projection device 1.

Furthermore, with image projection device 1, since image processing to be performed on image data to correct a color shift in a display image is not necessary, an ASIC or software used for image processing can be eliminated, and the manufacturing cost of image projection device 1 can be reduced. Moreover, image data is not lost due to image processing, and image projection device 1 can realize highly accurate color reproduction.

Note that, in the first exemplary embodiment, an explanation has been given taking an example where projection surface information that indicates spectral reflectance property is stored in wall color storage section 5, but projection surface information indicating the color value of each colored light which has been projected by light source section 2 and that is reflected by a projection surface may be stored in wall color storage section 5. In this case, wall color correction section 6 holds in advance the color value of each colored light to be emitted by light source section 2, and calculates, based on Equation 7, conversion matrix A using the color value of each colored light emitted by light source section 2 and the color value of each colored light reflected by a projection surface.

Next, an exemplary configuration of a second exemplary embodiment will be described.

Figure 3:
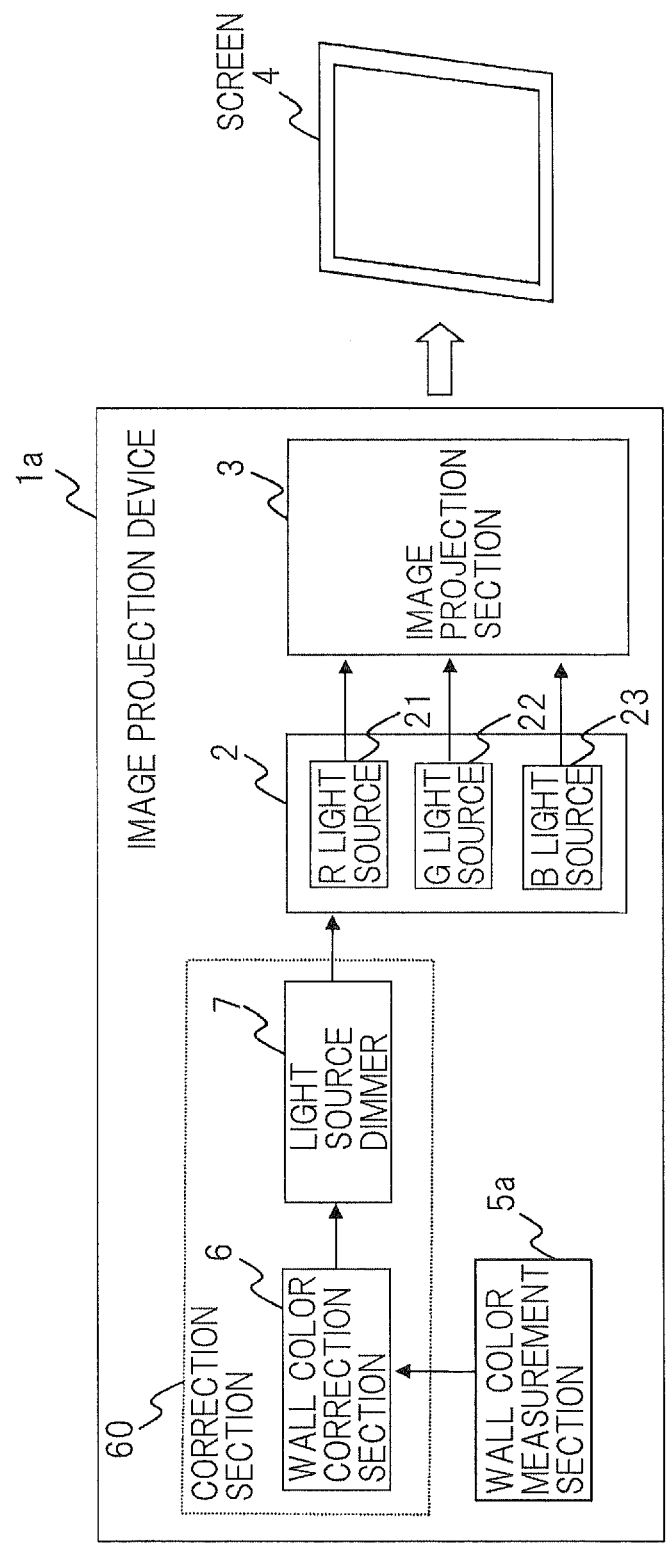
FIG. 3 is a diagram showing an image projection device according to a second exemplary embodiment.

FIG. 3 is a diagram showing image projection device 1a of the second exemplary embodiment.

Image projection device 1a includes wall color measurement section 5a instead of wall color storage section 5 shown in FIG. 1. Structures other than wall color measurement section 5a that configure image projection device 1a are the same as the structures shown in FIG. 1, and thus, they are denoted with the same reference numerals and repeated explanation thereof is omitted.

Wall color measurement section 5a can be generally referred to as measurement means or storage means.

Wall color measurement section 5a measures the spectral reflectance of the projection surface of screen 4, and outputs projection surface information indicating the measured spectral reflectance. In the present exemplary embodiment, the color value of each colored light of light source section 2 reflected by the projection surface is used as the spectral reflectance of the projection surface.

A color sensor is used as wall color measurement section 5a, for example.

In the present exemplary embodiment, in a situation where image data expressed by values between a darkest value and a lightest value, from "0" to "1", is to be received, image projection device 1a projects each colored light of red (1, 0, 0), green (0, 1, 0) or blue (0, 0, 1) onto screen 4. When each colored light is projected, wall color measurement section 5a measures the reflected light of screen 4. Accordingly, wall color measurement section 5a determines the color value of each colored light (X'r, Y'r, Z'r), (X'g, Y'g, Z'g) or (X'b, Y'b, Z'b) reflected by the projection surface.

After measuring the color value of each colored light reflected by the projection surface, wall color measurement section 5a stores the projection surface information that indicates the measurement result and outputs the projection surface information to correction section 60.

According to the second exemplary embodiment, wall color measurement section 5a measures the spectral reflectance of the projection surface of screen 4, and outputs projection surface information that indicates the spectral reflectance. Wall color correction section 6 determines a correction value using the projection surface information output by wall color measurement section 5a, and calculates the intensity values of a plurality of colored lights after correction, based on the correction value and predetermined values of intensity of the plurality of colored lights. Light source dimmer 7 adjusts the intensity values of a plurality of colored lights emitted by light source section 2 to the intensity values of a plurality of colored lights calculated by wall color correction section 6.

Accordingly, since image projection device 1a controls light source section 2 using the result of measuring the projection surface of screen 4, a color shift in an image on the projection surface that occurs not only due to the color of screen 4, but the ambient light around image projection device 1a (for example, the sun or a fluorescent light) can be corrected. Image projection device 1a is thereby allowed to display an image, whose colors have been accurately reproduced, on the projection surface, even in a situation where the color of screen 4 or the ambient light around image projection device 1a is different.

Note that in the second exemplary embodiment, image projection device 1a may include wall color storage section 5 shown in FIG. 1, and wall color storage section 5 may store a plurality of pieces of projection surface information, each piece of projection surface information being associated with a correction value determined using the projection surface information. In this case, when image data is received, wall color correction section 6 refers to wall color storage section 5, and calculates the intensity values of a plurality of colored lights after correction based on the correction value associated with the projection surface information output by wall color measurement section 5a and predetermined values of the intensity of the plurality of colored lights.

Accordingly, wall color correction section 6 does not have to determine a correction value using projection surface information indicating spectral reflectance every time wall color measurement section 5a measures the spectral reflectance of a projection surface. Therefore, image projection device 1a can reduce computational processing for determining a correction value using projection surface information, and the amount of processing of image projection device 1a can be reduced.

In the exemplary embodiments described above, the structures shown are merely examples, and the present invention is not limited to such structures.

REFERENCE SIGNS LIST

1 Image projection device
2 Light source section
21 R light source
22 G light source
23 B light source 3 Image projection section
5 Wall color storage section
5a Wall color measurement section
6 Wall color correction section
7 Light source dimmer
60 Correction section

The invention claimed is:

1. An image projection device including a light source that emits a plurality of colored lights, and a projection section that modulates each colored light emitted by said light source according to image data and projects an image onto a projection surface, the image projection device comprising:

a storage section that stores projection surface information indicating a spectral reflectance of the projection surface;

a correction section that determines, when the image data is received, a correction value for correcting a color shift in the image on the projection surface using the projection surface information, and corrects intensity values of the plurality of colored lights emitted by said light source by controlling said light source according to the correction value; and a measurement section that measures the spectral reflectance of the projection surface and outputs the projection surface information indicating the spectral reflectance to said correction section, wherein said correction section includes a calculator that determines a correction value using the projection surface information output by said measurement section, and calculates, based on the correction value and predetermined values of intensity of the plurality of colored lights, intensity values of a plurality of colored lights after correction, and a dimmer that adjusts the intensity values of the plurality of colored lights emitted by said light source to the intensity values of the plurality of colored lights calculated by the calculator.

2. The image projection device according to claim 1, wherein said storage section stores, for each piece of projection surface information, the projection surface information and a correction value determined using the projection surface information in association with each other, and wherein the calculator calculates the intensity values of the plurality of colored lights after correction, based on a correction value that is associated with the projection surface information output by said measurement section and the predetermined values of intensity of the plurality of colored lights.

3. A color correction method of an image projection device including a light source that emits a plurality of colored lights, and a projection section that modulates each colored light emitted by the light source according to image data and projects an image onto a projection surface, the color correction method comprising:

storing projection surface information indicating a spectral reflectance of the projection surface;

determining, when the image data is received, a correction value for correcting a color shift in the image on the projection surface using the projection surface information, and correcting intensity values of the plurality of colored lights emitted by the light source by controlling the light source according to the correction value; and measuring the spectral reflectance of the projection surface and outputting the projection surface information indicating the spectral reflectance, wherein said measuring includes determining a correction value using the projection surface information output in said measuring, and calculating, based on the correction value and predetermined values of intensity of the plurality of colored lights, intensity values of a plurality of colored lights after correction, and adjusting the intensity values of the plurality of colored lights emitted by the light source to the intensity values of the plurality of colored lights calculated in the calculating.

* * * * *